United States Patent [19]

Ha-Ngoc

[11] Patent Number: 5,625,463
[45] Date of Patent: Apr. 29, 1997

[54] VIDEO RECORDER WITH BACKGROUND AUDIO

[76] Inventor: Tuan Ha-Ngoc, 8 Kitson Park Dr., Lexington, Mass. 02173

[21] Appl. No.: 277,815

[22] Filed: Jul. 20, 1994

[51] Int. Cl.$^6$ .................... H04N 5/91; H04N 5/76; H04N 5/226; H04N 5/78
[52] U.S. Cl. ................ 386/106; 358/909.1; 386/107; 386/117
[58] Field of Search .................... 360/19.1; 358/343, 358/341, 335, 906, 909.1; 348/462; 381/104, 108, 80; 352/26

[56] References Cited

U.S. PATENT DOCUMENTS

| | | | |
|---|---|---|---|
| 3,518,375 | 6/1970 | Hawkins | 381/80 |
| 4,807,051 | 2/1989 | Ogura | 358/341 |
| 4,809,079 | 2/1989 | Blazek et al. | 358/335 |
| 4,864,627 | 9/1989 | Dugan | 381/108 |
| 5,124,814 | 6/1992 | Takahashi et al. | 358/906 |
| 5,260,784 | 11/1993 | Kamiyama et al. | 358/139 |

FOREIGN PATENT DOCUMENTS 2223645  11/1990  United Kingdom.

Primary Examiner—Thai Q. Tran
Assistant Examiner—LuAnne D. Din
Attorney, Agent, or Firm—Kenyon & Kenyon

[57] ABSTRACT

A video recorder automatically adds desired audio signals to the video signals being recorded without intervention of the operator. A sensor detects when voice signals are not being sensed by the microphone in the video recorder and automatically inserts a preselected audio signal. The operator can select from several audio signals as the default audio signal to be added when no voice signals are being recorded. A switch switches off the microphone output to the video tape recorder when no voice, is being detected to prevent unwanted noise from being added to the tape. The volume level of the background music when voice is detected is adjusted so that when no voice is being detected the volume of the preselected audio signal is at one level, and when voice is detected, the volume of the preselected audio signal is at another level, e.g., significantly reduced. This permits the listener to follow the track of the audio signal without disturbing jumps in the background music. Alternatively, the signal level being applied to the tape can be continuously adjusted to vary the volume of the added audio signal as a function of the detected voice signals. This ensures that when the tape is played back no large jumps in volume occur due to radical changes in the detected voice levels, i.e., the volume remains relatively constant despite large variations in voice signal levels.

7 Claims, 7 Drawing Sheets

VIDEO RECORDER WITH BACKGROUND AUDIO

BACKGROUND OF THE INVENTION

The present invention relates generally to video recorders, and more particularly to a video recorder that adds background audio signals as a soundtrack to a video signal as it is being recorded.

U.S. Pat. No. 5,124,814 discloses a video tape recorder with an integrated camera that permits the addition of an audio signal to the video signal being recorded. Unfortunately, this video recorder requires the operator to select when an audio signal is to be added to the tape, and once the signal is added, it continues until the operator turns it off. This requires the operator to continuously pay attention to the soundtrack rather than permitting the operator to concentrate on the video image being recorded, which after all is the main purpose of making a video recording.

The present invention is directed to the problem of developing a video recorder that automatically adds desired audio signals as background audio to the video signals being recorded without intervention of the operator.

SUMMARY OF THE INVENTION

The present invention solves this problem by providing a sensor that detects when there are no voice signals being sensed by the microphone in the video recorder and automatically inserts a preselected audio signal. When the voice signals return, the present invention provides that the background audio signals are reduced in volume, or completely suppressed.

An advantageous embodiment of the present invention permits the operator to select from several audio signals as the default audio signal to be added when no voice signals are being recorded. The operator can also select an order of audio signals to add for particularly long length recordings.

Another advantageous embodiment of the present invention switches off the microphone output to the video tape recorder when no voice is being detected to prevent unwanted noise from being added to the tape.

Another advantageous embodiment of the present invention switches the volume level of the background music when voice is detected so that when no voice is being detected the volume of the preselected audio signal is at one level, and when voice is detected, the volume of the preselected audio signal is at another level, e.g., significantly reduced. This permits the listener to follow the track of the audio signal without disturbing jumps in the background music.

Another advantageous embodiment of the present invention controls the signal level being applied to the tape to continuously adjust the volume of the background music as a function of the detected voice signals. This ensures that when the tape is played back no large jumps in volume occur due to radical changes in the detected voice levels.

Another advantageous embodiment of the present invention uses a integrated circuit chip as the source of the audio signals to be added. This would allow consumers to quickly and cheaply change the audio signals to be added as background.

Alternatively, the present invention employs a standard cassette recorder as the source of audio signals to be added. This embodiment would permit the operator unlimited flexibility in choice of background audio, with a slight increase in controlled complexity.

Alternatively, the present invention employs a standard compact disk player as the source of audio signals to be added. In this embodiment, a mini CD port can be provided on the camera. This embodiment permits the user the unlimited flexibility of choice of background audio with the advantages of digital sound. The compact disk player could either output analog signals directly to the tape recorder, or properly formatted digital signals for use, by the circuitry of the tape recorder.

An additional advantageous embodiment occurs when the system controls the background music such that when voice signals are detected, the background music quickly fades out to a preset adjustable level; when voice signals discontinue, after an adjustable delay, music fades back in more slowly.

DETAILED DESCRIPTION

Figure 1:
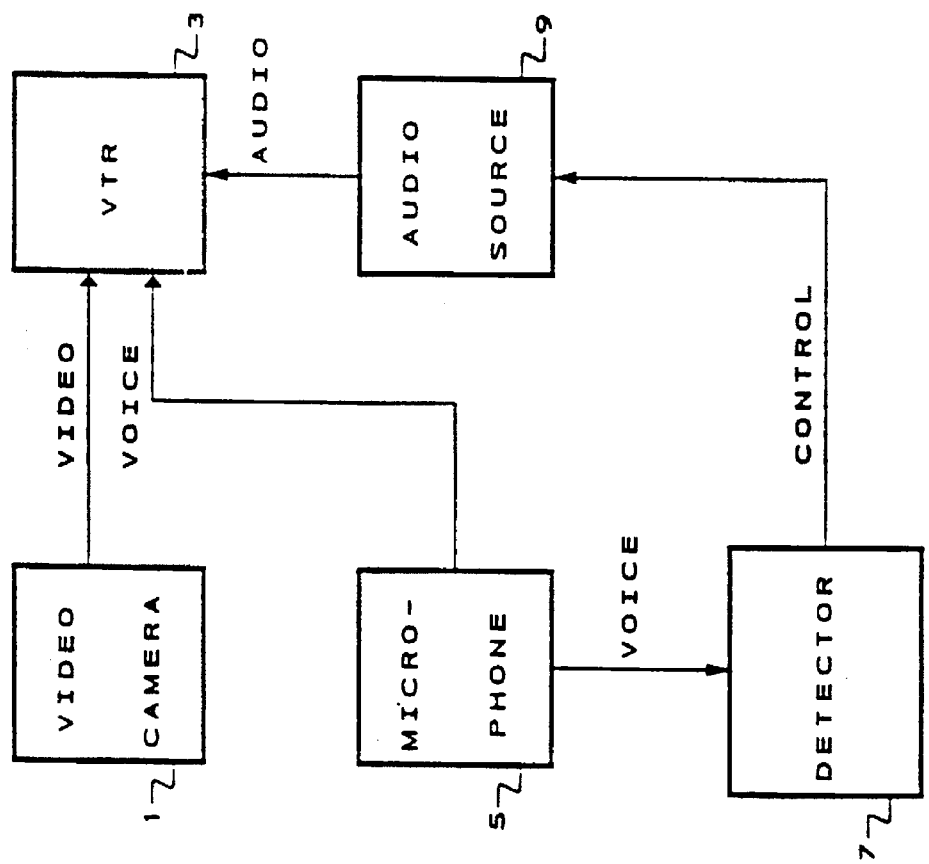
FIG. 1 depicts one embodiment of the system according to the present invention, in which a microphone is coupled directly to the VTR.

FIG. 1 depicts one possible embodiment of the system according to the present invention. The video camera 1 converts a video image into a video signal that the operator desires to record. The video camera 1 can be any known video camera for the purposes of the present invention. The video signal is output to a video tape recorder (VTR) 3. The VTR 3 of this embodiment can be any known VTR, as long as it has separate video and audio inputs. While two separate audio inputs (i.e., voice and audio) to the VTR are shown in FIG. 1, these could easily be coupled together with a jack so that the VTR 3 need only have one audio input.

A microphone 5 senses voice signals generated during the recording, and provides the voice signals to the VTR 3. The microphone of FIG. 1 can be any known microphone, preferably a directional microphone that senses audio signals (e.g., voices) exclusively from the subject being videoed. While two separate outputs are shown, a microphone with only one, output can easily be converted to two with a splitter. The microphone 5 also provides the voice signals to a voice detector 7.

The voice detector 7 determines whether voice signals are present or not. Voice detectors are known, and do not form part of the present invention. Therefore, a detailed description of the operation of a voice detector is unnecessary for the purposes of the present invention. If voice signals are present, the voice detector 7 disables the output from the audio source 9 to the VTR 3. If voice signals are not present, the voice detector 7 enables the output from the audio source 9. In this case, the audio source 9 provides background audio signals for recording by the VTR 3 with the video signal from the video camera 1. In this way, the system of the present invention automatically determines whether background audio signals are necessary, and provides them. To determine whether voice signals are being detected, the voice detector should have a preselectable adjustable threshold such that when voice signals drop below this threshold, the voice detector determines that voice signals are not present. When voice signals rise above this threshold, the voice detector should determine that voice signals are present. Preferably, the operator could adjust this threshold for different recording situations, such as when loud background noise exists, or when several speakers are present.

The audio source 9 is capable of storing several audio signals between which the operator can choose. If the audio source is a micro-cassette, the operator can change cassettes or tracks to select the appropriate background audio. If the audio source is a compact disk (CD), the operator can change CD's or change the selection from which the background audio originates. If the audio source is a CD-ROM, the operator can change selections, or CD-ROMS. If the audio source is a diskette, the operator can change diskettes, or select the file in which the desired audio signals are stored. Finally, if the audio source is an integrated circuit chip, the operator can change the chip, or change an address on the chip itself, either by a dip switch or by electronically addressing the chip via a personal computer, for example.

If the audio source is a CD player, the video camera can be provided with a mini CD port. This would enable the audio circuitry to be incorporated in the camera.

Figure 2:
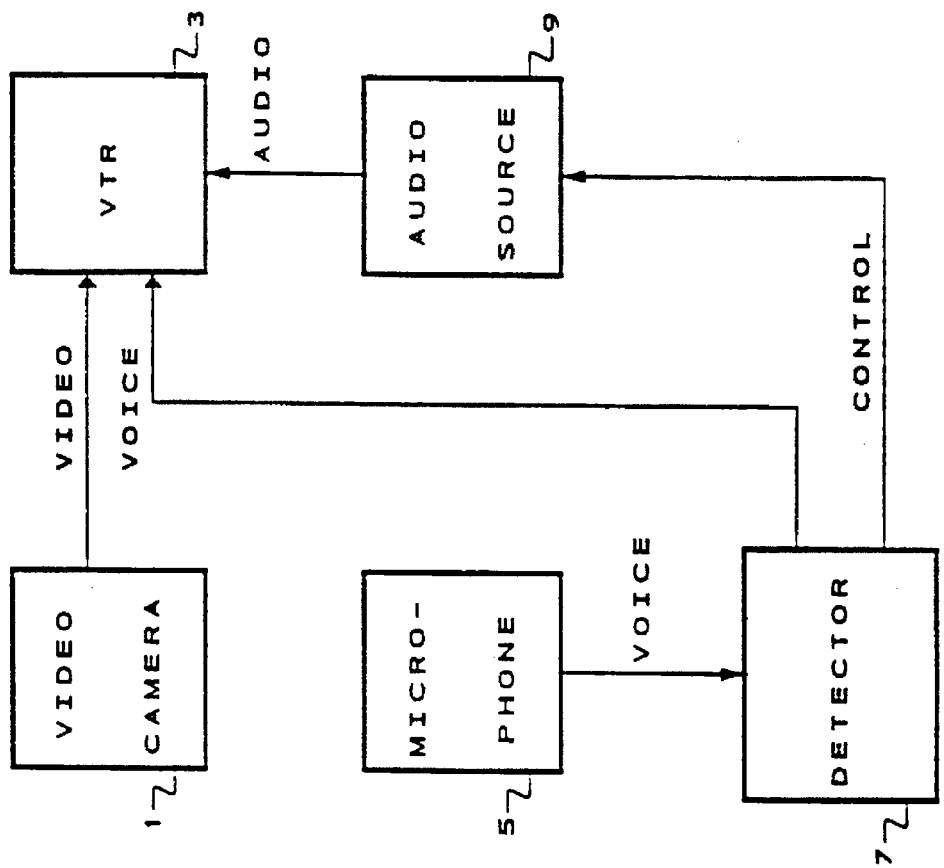
FIG. 2 depicts an alternative embodiment of the system according to the present invention, in which the microphone is coupled to the VTR via the detector.

FIG. 2 depicts the same general embodiment shown in FIG. 1, except that the voice detector 7 is disposed between the microphone 5 and the VTR 3. This allows the voice detector 7 to interrupt the voice output to the VTR 3 when no voice is being detected to reduce recording noise. This embodiment also reduces one output from the microphone 5.

Figure 3:
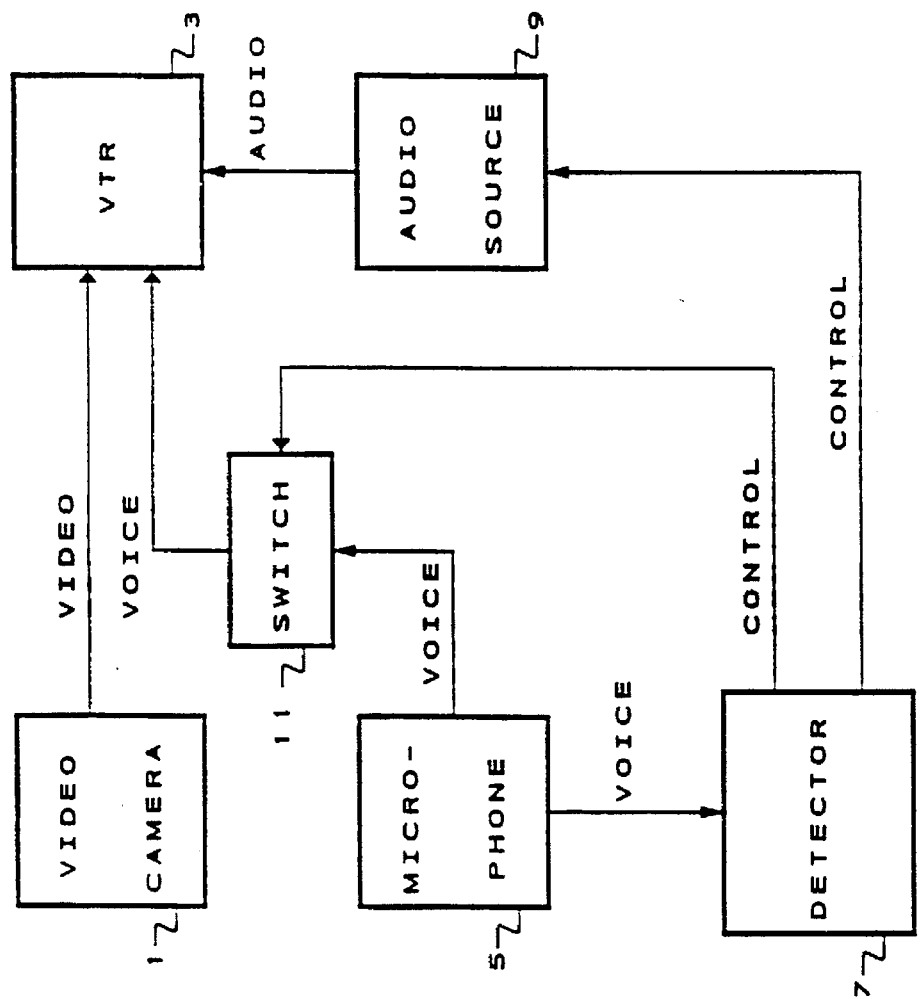
FIG. 3 depicts another embodiment of the system according to the present invention, which includes a switch between the microphone and the detector.

FIG. 3 depicts the same general embodiment shown in FIG. 1, except that a switch 11 is disposed between the microphone 5 and the VTR 3. The switch 11 is controlled by the voice detector 7, such that when no voice is detected, the voice detector 7 opens the switch 11 so that no voice or noise signals reach the VTR 3 via the voice line. The switch 11 can be any known switch, such as a transistor, for example. The switch 11 merely passes the voice signals through under control of the voice detector 7.

Figure 4:
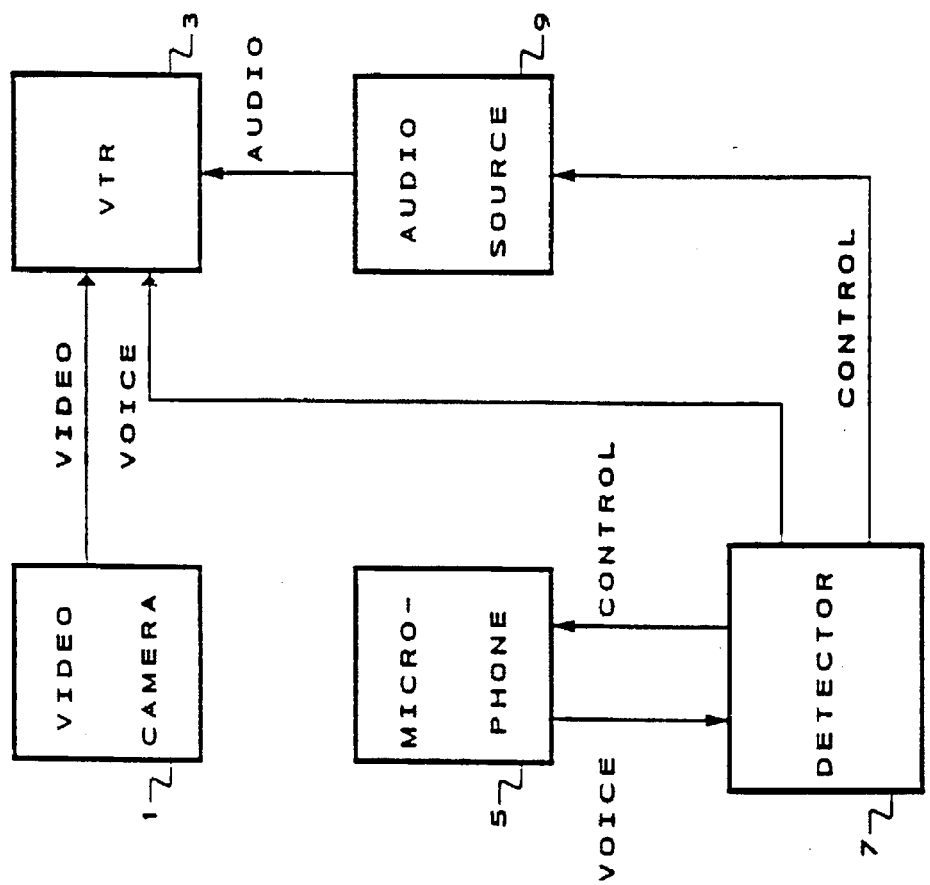
FIG. 4 depicts another embodiment of the system according to the present invention, which depicts the microphone under control of the detector.

FIG. 4 depicts the same embodiment shown in FIG. 2, except that a control line has been added between the microphone 5 and the voice detector 7. The control permits the voice detector 7 to adjust the volume of the microphone 5 as needed. For example, when no voice is being detected, the voice detector 7 may reduce the volume of the microphone 5 to prevent noise from being recorded. Furthermore, the voice detector 7 may increase the sensitivity of the microphone 5 when no voice signals are being detected to ensure that the proper signals are recorded, i.e., that no voice signals are inadvertently missed.

Figure 5:
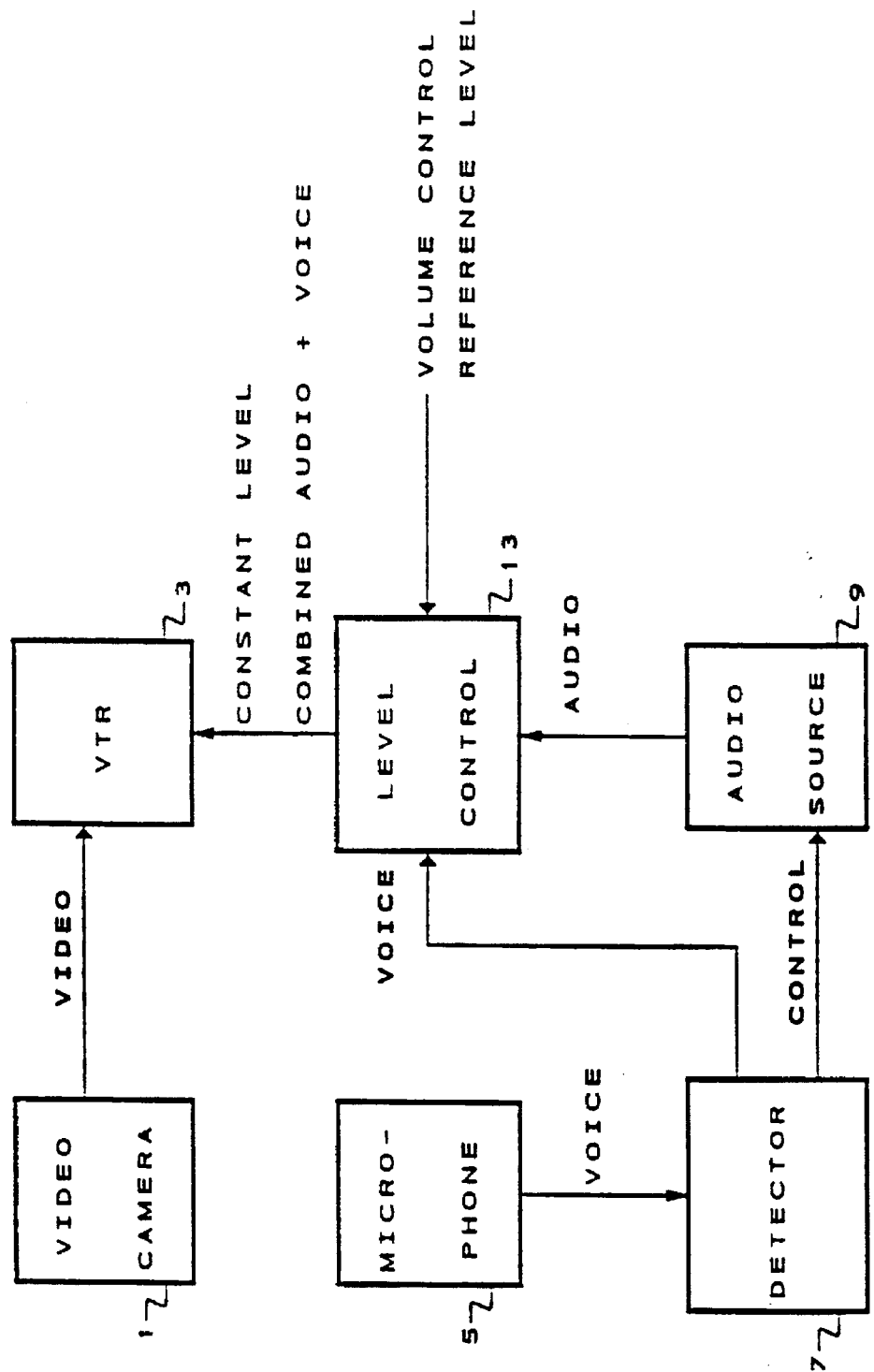
FIG. 5 depicts another embodiment of the system according to the present invention, which includes a controller between the audio source and the VTR.

FIG. 5 depicts the same general embodiment as shown in FIG. 2, except that a level control 13 has been added between the audio source 9 and the voice detector 7. The level control 13 operates to maintain the level of the total audio signal (i.e., voice and background audio) provided to the VTR 3 at a relatively constant level. The voice signal from the voice detector 7 is provided to one input and the desired audio signal from the audio source 9 is provided to another input. The third input is the volume control reference level, which can be selected by the operator or controlled by the VTR 3 to provide the reference at which the audio is to be recorded.

Figure 6:
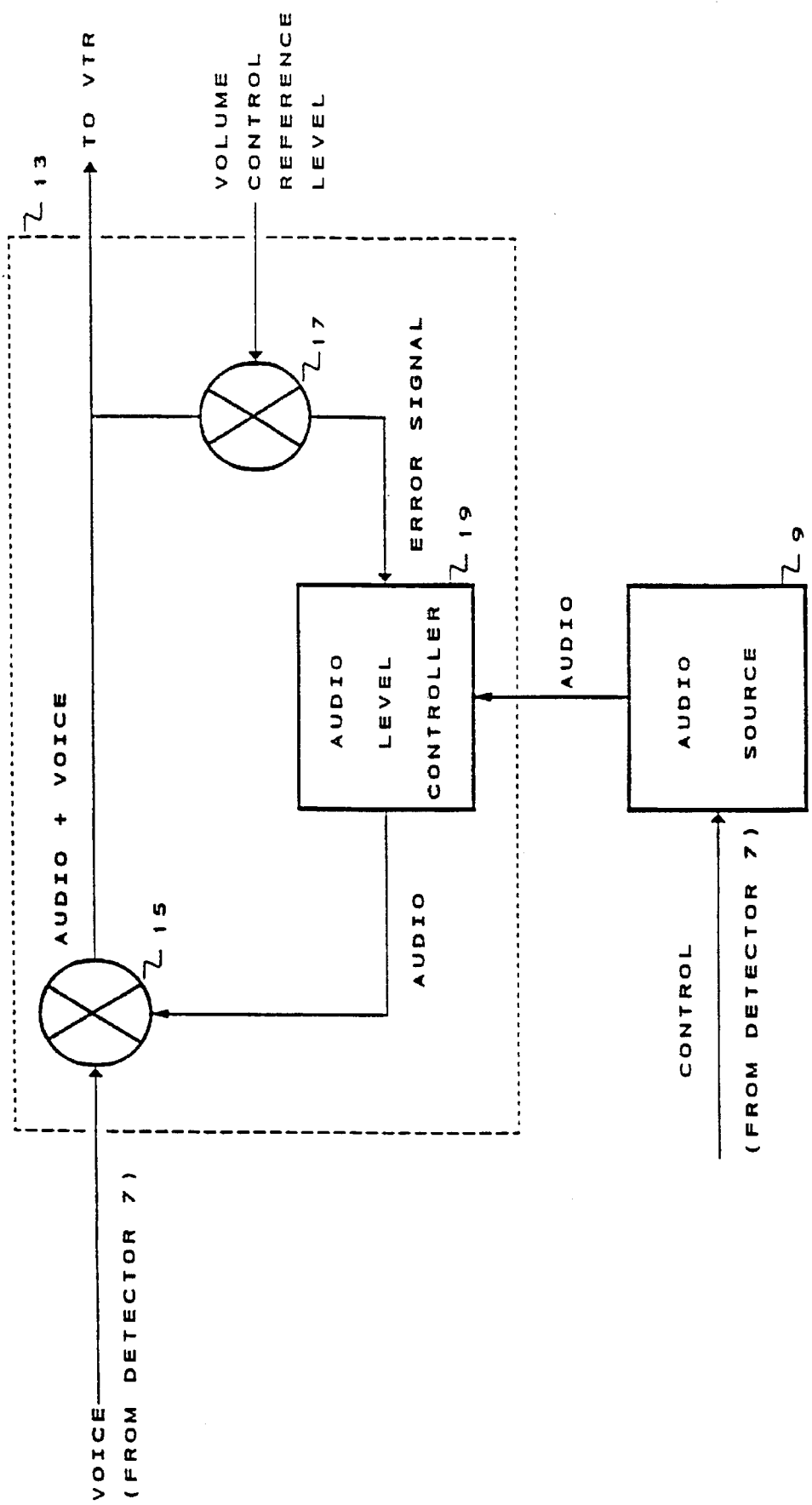
FIG. 6 depicts one possible embodiment of the controller of FIG. 5.

FIG. 6 depicts one possible embodiment of the circuit of the level control 13 depicted in FIG. 5. The dashed line indicates the boundaries of the level control 13. Summing element 15 combines the voice signal from the voice detector 7 and the audio signal from the audio source 9. The output is provided to the VTR 3. The output is also fed back to summing element 17 and compared to the volume control reference level selected by the operator or the VTR 3. If the level of the combined voice and audio signal is higher than the volume control reference level, then the audio level controller reduces the audio signal level from the audio source 9, and the reduced audio signal is provided to summing element 15. If the level of the combined voice and audio signal is lower than the volume control reference level, then the audio level controller 19 increases the audio signal level from the audio source 9, and the increased audio signal is provided to summing element 15. This feedback loop thus operates to provide a combined audio voice signal at a constant level set by the operator or the VTR 3. Furthermore, a hardlimiter could be provided at the output of the summing element 15 to prevent excessive voice signals from being applied to the VTR.

Figure 7:
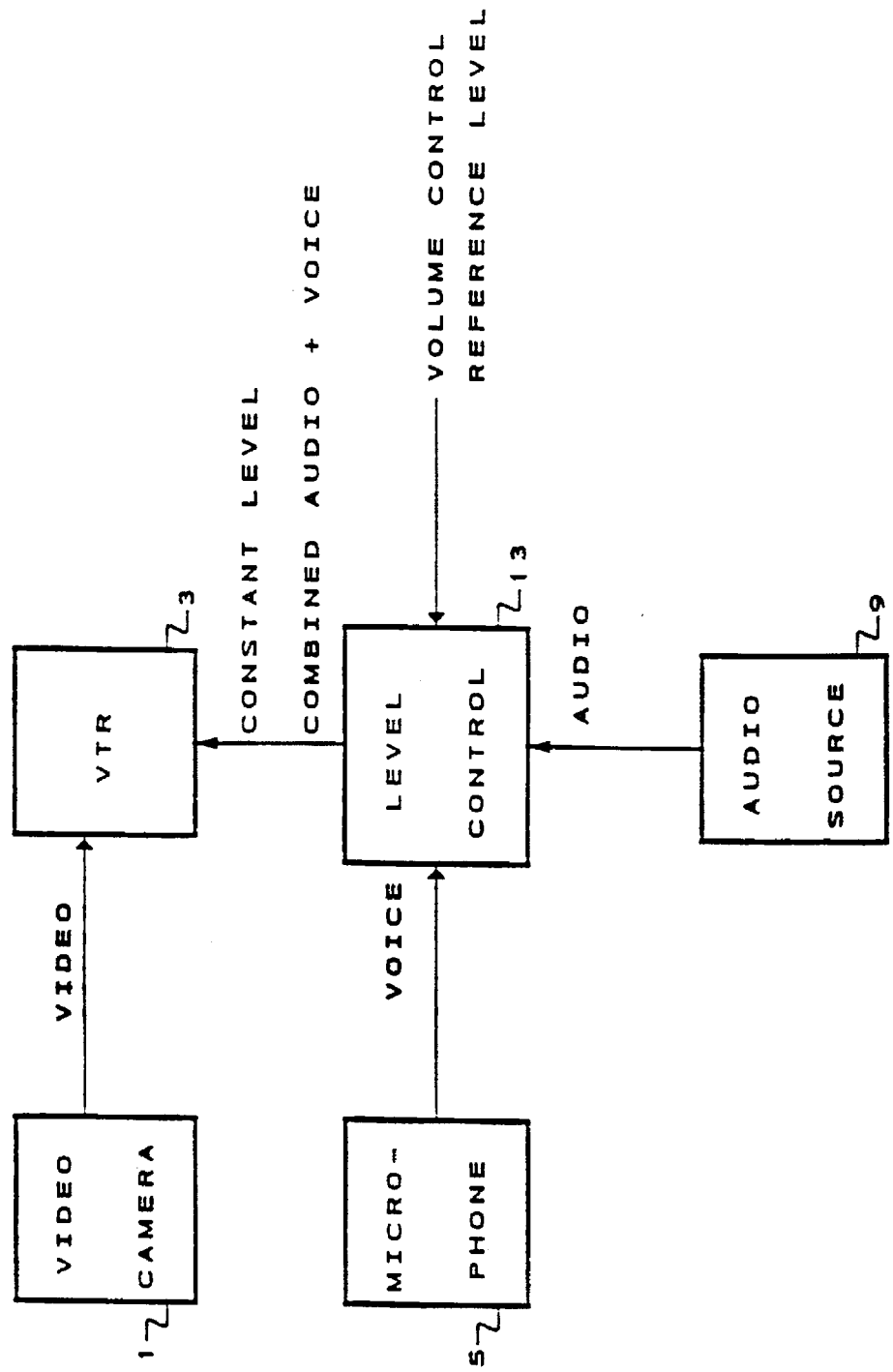
FIG. 7 depicts an alternative embodiment of the present invention that dispenses with the voice detector.

FIG. 7 depicts one additional embodiment of the present invention. In this embodiment, the voice detector is unnecessary because the level control 13 functions to combine the voice signals and the preselectable audio signals. The level control 13 functions as depicted in FIG. 6, however, the voice signals are provided directly from the microphone 5 to the level control 13, and the audio source 9 is not controlled by the voice detector 7. The audio source 9 continuously provides its preselectable audio signal to the level control 13. As the voice signals from the microphone 5 increase, the level control 13 reduces the level of the preselectable audio signal until the level of the combined audio signal reaches the level specified by the operator or the VTR. As the voice signals from the microphone 5 decrease, the level control 13 increases the level of the preselectable audio signal until the combined audio signal reaches the level specified by the operator or the VTR. When the voice signals from the microphone. 5 reach zero, the combined audio signal consists entirely of the preselectable audio signal. Conversely, when the voice signals from the microphone 5 reach the level specified by the operator or the VTR, the combined audio signal consists entirely of the voice signals from the microphone 5. The level control 13 could have a minimum level that the preselectable audio signal does not go below to prevent drastic jumps in the soundtrack, which are usually annoying to the listener.

One particularly advantageous feature of the present invention controls the tithing of the added audio signal such that the audio signal to be added quickly fades to an preset adjustable level when voice signals are detected. When voice signals are no longer being detected, after an adjustable delay, the audio signal to be added fades in more slowly than it faded out. This provides a more soothing sound to the listener in that the sound is only changed quickly on detection of the voice signals and prevents voice signals from being cut off at the beginning. When the voice signals discontinue, the audio or music is slowly faded in to prevent the music from cutting on and off as the speaker pauses.

Thus, the present invention permits the operator to select an audio soundtrack for the video recording in advance, and automatically adds this soundtrack when no voice signals are being detected. Furthermore, the present invention automatically adjusts the volume of the soundtrack as voice signals come and go. This permits an amateur video operator to create professional sounding tapes without requiring complicated sound engineering equipment to add the soundtrack after the recording.

What is claimed is:

1. A video recorder comprising:
   a) a video camera producing a video signal based on a video image;
   b) a microphone producing an audio signal;
   c) a video tape recorder being coupled to the video camera and the microphone, and recording the video and audio signals;
   d) a detector being coupled to the microphone and sensing a voice signal during recording; and
   e) an audio source being coupled to the video tape recorder and the detector and providing a preselectable audio signal to the video recorder when voice signals lower than a preselected adjustable level are being detected by the detector;
   f) a controller being coupled between the microphone and the video tape recorder and controlling an audio signal level being recorded by the video tape recorder so that during playback a constant volume results, wherein the controller further comprises:
      (i) a summing element having a first input receiving the voice signal from the detector, having a second input receiving the preselected audio signal and outputting a sum of the voice signal and the preselectable audio signal as the combined audio signal;
      (ii) a difference element having a first input receiving the combined audio signal, having a second input receiving a volume control reference level, and outputting an error signal which represents a difference between the combined audio signal and the volume control reference level;
      (iii) an audio level controller having a first input receiving the preselectable audio signal, having a second input receiving the error signal, and outputting the preselectable audio signal at a level based on the error signal.

2. The video recorder according to claim 1, wherein the audio source stores a plurality of audio signals between which an operator of the video recorder can select as the preselectable audio signal.

3. The video recorder according to claim 1, wherein the audio source comprises an integrated circuit.

4. The video recorder according to claim 1, wherein the audio source comprises an audio cassette player.

5. The video recorder according to claim 1, wherein the audio source comprises a compact disk player.

6. The video recorder according to claim 1, wherein the audio source comprises a CD rom player.

7. The video recorder according to claim 3, wherein the integrated circuit is programmable by a personal computer.

* * * * *

UNITED STATES PATENT AND TRADEMARK OFFICE
CERTIFICATE OF CORRECTION

PATENT NO. : 5,625,463
DATED : 29 April 1997
INVENTOR(S) : Tuan Ha-Ngoc

It is certified that error appears in the above-identified patent and that said Letters Patent is hereby corrected as shown below:

IN THE ABSTRACT, Line 9 : After "voice" delete ",".

| Column | Line | |
|---|---|---|
| 2 | 8 | After "use" delete ",". |
| 2 | 52 | Change "dining" to --during--. |
| 2 | 57 | After "one" delete ",". |
| 4 | 43 | After "microphone" delete ".". |
| 4 | 53 | Change "tithing" to --timing--. |

Signed and Sealed this

Third Day of February, 1998

Attest:

BRUCE LEHMAN

Attesting Officer     Commissioner of Patents and Trademarks